United States Patent
Orcutt et al.

(10) Patent No.: US 6,714,336 B2
(45) Date of Patent: Mar. 30, 2004

(54) PACKAGED MICROMIRROR ASSEMBLY WITH IN-PACKAGE MIRROR POSITION FEEDBACK

(75) Inventors: John W. Orcutt, Richardson, TX (US); Robert C. Keller, Plano, TX (US); Jose L. Melendez, Plano, TX (US); Dwight Bartholomew, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 156 days.

(21) Appl. No.: 09/957,476

(22) Filed: Sep. 20, 2001

(65) Prior Publication Data

US 2002/0070335 A1 Jun. 13, 2002

Related U.S. Application Data

(60) Provisional application No. 60/233,851, filed on Sep. 20, 2000, and provisional application No. 60/231,382, filed on Sep. 8, 2000.

(51) Int. Cl.[7] ............... G02B 26/00; G02B 26/08; G02F 1/01
(52) U.S. Cl. ............... 359/290; 359/238; 359/225
(58) Field of Search ................. 359/199, 201, 359/223, 224, 290

(56) References Cited

U.S. PATENT DOCUMENTS

2002/0034024 A1 * 3/2002 Orcutt et al. ............... 359/846
2003/0034026 A1 * 3/2002 Orcutt et al. ............... 359/877
2002/0075553 A1 * 9/2002 Orcutt ....................... 359/295
2003/0141439 A1 * 7/2003 Heminger et al. .......... 250/221

* cited by examiner

Primary Examiner—Georgia Epps
Assistant Examiner—David N. Spector
(74) Attorney, Agent, or Firm—William B. Kempler; W. James Brady, III; Frederick J. Telecky, Jr.

(57) ABSTRACT

A packaged micromirror assembly (21, 21') is disclosed. The assembly (21, 21') includes a mirror element (41) having a mirror surface (29) that can rotate in two axes. Magnets (53) are attached to the mirror element (41), to permit rotation of the mirror surface (29) responsive to the energizing of coil drivers (36). A sensor (63, 80) is disposed under the mirror surface (29) to detect mirror orientation. In one aspect of the invention, the sensor (63) includes a light source such as an LED (68) that imparts light through an aperture (66) at the underside of the mirror surface (29). Light detectors (65) are arranged at varying angles, and detect relative intensity of light reflected from the underside of the mirror surface (29), from which the rotational position of the mirror (29) can be derived. According to another aspect of the invention, a conical sensor (80) with multiple insulated segmented capacitor plates are arranged under the mirror surface (29). Variations in the capacitance between the mirror (29) and the various segments of the sensor (80) indicate the position of the mirror (29). A calibration memory (77) may be provided, to store calibration values so that the sensor (63, 80) can be nulled with the mirror (29).

20 Claims, 5 Drawing Sheets

PACKAGED MICROMIRROR ASSEMBLY WITH IN-PACKAGE MIRROR POSITION FEEDBACK

CROSS-REFERENCE TO RELATED APPLICATIONS

This application claims priority under 35 USC §199 (e) (1) of Provisional Application No. 60/233,851, filed Sep. 20, 2000 and Provisional Application No. 60/231,382, filed Sep. 8, 2000. This application is also related to U.S. patent application Ser. No. 09/955,539 entitled "Stacked Micromirror Structures" filed on Sep. 18, 2001, and U.S. patent application Ser. No. 09/955,506 entitled Molded Packages for Optical Wireless Network Micromirror Assemblies filed on Sep. 18, 2001.

STATEMENT REGARDING FEDERALLY SPONSORED RESEARCH OR DEVELOPMENT

Not applicable.

BACKGROUND OF THE INVENTION

This invention is in the field of optical communications, and is more specifically directed to micromirror assemblies as used in such communications.

Modern data communications technologies have greatly expanded the ability to communicate large amounts of data over many types of communications facilities. This explosion in communications capability not only permits the communications of large databases, but has also enabled the digital communications of audio and video content. This high bandwidth communication is now carried out over a variety of facilities, including telephone lines (fiber optic as well as twisted-pair), coaxial cable such as supported by cable television service providers, dedicated network cabling within an office or home location, satellite links, and wireless telephony.

Each of these conventional communications facilities involves certain limitations in their deployment. In the case of communications over the telephone network, high-speed data transmission, such as that provided by digital subscriber line (DSL) services, must be carried out at a specific frequency range to not interfere with voice traffic, and is currently limited in the distance that such high-frequency communications can travel. Of course, communications over "wired" networks, including the telephone network, cable network, or dedicated network, requires the running of the physical wires among the locations to be served. This physical installation and maintenance is costly, as well as limiting to the user of the communications network.

Wireless communication facilities of course overcome the limitation of physical wires and cabling, and provide great flexibility to the user. Conventional wireless technologies involve their own limitations, however. For example, in the case of wireless telephony, the frequencies at which communications may be carried out are regulated and controlled; furthermore, current wireless telephone communication of large data blocks, such as video, is prohibitively expensive, considering the per-unit-time charges for wireless services. Additionally, wireless telephone communications are subject to interference among the various users within the nearby area. Radio frequency data communication must also be carried out within specified frequencies, and is also vulnerable to interference from other transmissions. Satellite transmission is also currently expensive, particularly for bi-directional communications (i.e., beyond the passive reception of television programming).

A relatively new technology that has been proposed for data communications is the optical wireless network. According to this approach, data is transmitted by way of modulation of a light beam, in much the same manner as in the case of fiber optic telephone communications. A photoreceiver receives the modulated light, and demodulates the signal to retrieve the data. As opposed to fiber optic-based optical communications, however, this approach does not use a physical wire for transmission of the light signal. In the case of directed optical communications, a line-of-sight relationship between the transmitter and the receiver permits a modulated light beam, such as that produced by a laser, to travel without the waveguide of the fiber optic.

It is contemplated that the optical wireless network according to this approach will provide numerous important advantages. First, high frequency light can provide high bandwidth, for example ranging from on the order of 100 Mbps to several Gbps, using conventional technology. This high bandwidth need not be shared among users, when carried out over line-of-sight optical communications between transmitters and receivers. Without the other users on the link, of course, the bandwidth is not limited by interference from other users, as in the case of wireless telephony. Modulation can also be quite simple, as compared with multiple-user communications that require time or code multiplexing of multiple communications. Bi-directional communication can also be readily carried out according to this technology. Finally, optical frequencies are not currently regulated, and as such no licensing is required for the deployment of extra-premises networks.

These attributes of optical wireless networks make this technology attractive both for local networks within a building, and also for external networks. Indeed, it is contemplated that optical wireless communications may be useful in data communication within a room, such as for communicating video signals from a computer to a display device, such as a video projector.

It will be apparent to those skilled in the art having reference to this specification that the ability to correctly aim the transmitted light beam to the receiver is of importance in this technology. Particularly for laser-generated collimated beams, which can have quite small spot sizes, the reliability and signal-to-noise ratio of the transmitted signal are degraded if the aim of the transmitting beam strays from the optimum point at the receiver. Especially considering that many contemplated applications of this technology are in connection with equipment that will not be precisely located, or that may move over time, the need exists to precisely aim and controllably adjust the aim of the light beam.

Copending application Ser. No. 09/310,284, filed May 12, 1999, entitled "Optical Switching Apparatus", commonly assigned herewith and incorporated herein by this reference, discloses a micromirror assembly for directing a light beam in an optical switching apparatus. As disclosed in this application, the micromirror reflects the light beam in a manner that may be precisely controlled by electrical signals. As disclosed in this patent application, the micromirror assembly includes a silicon mirror capable of rotating in two axes. One or more small magnets are attached to the micromirror itself; a set of four coil drivers are arranged in quadrants, and are current-controlled to attract or repel the micromirror magnets as desired, to tilt the micromirror in the desired direction.

Because the directed light beam, or laser beam, has an extremely small spot size, precise positioning of the mirror to aim the beam at the desired receiver is essential in establishing communication. This precision positioning is contemplated to be accomplished by way of calibration and feedback, so that the mirror is able to sense its position and make corrections.

BRIEF SUMMARY OF THE INVENTION

It is an object of the present invention to provide a package for a micromirror assembly that includes sensing capability for the position of the micromirror.

It is a further object of the present invention to provide a method for making such a package.

It is a further object of the present invention to provide such a package and method that is relatively low-cost, and also well suited for high-volume production.

Other objects and advantages of the present invention will be apparent to those of ordinary skill in the art having reference to the following specification together with its drawings.

The present invention may be implemented into a package for a micromirror assembly. The package is molded around a plurality of coil drivers, and their control wiring, for example by injection or transfer molding. A two-axis micromirror and magnet assembly is attached to a shelf overlying the coil drivers. Underlying the mirror is a sensor for sensing the angular position of the mirror. According to the preferred embodiment of the invention, the sensor includes a light-emitting diode and angularly spaced light sensors that can sense the intensity of light emitted by the diode and reflecting from the backside of the mirror. The position of the mirror can be derived from a comparison of the intensities sensed by the various angularly positioned light sensors.

DETAILED DESCRIPTION OF THE INVENTION

The present invention will be described in connection with its preferred embodiments, with an example of an application of these preferred embodiments in a communications network. It is contemplated, however, that the present invention may be realized not only in the manner described below, but also by way of various alternatives which will be apparent to those skilled in the art having reference to this specification. It is further contemplated that the present invention may be advantageously implemented and used in connection with a variety of applications besides those described below. It is therefore to be understood that the following description is presented by way of example only, and that this description is not to be construed to limit the true scope of the present invention as hereinafter claimed.

Figure 1A:
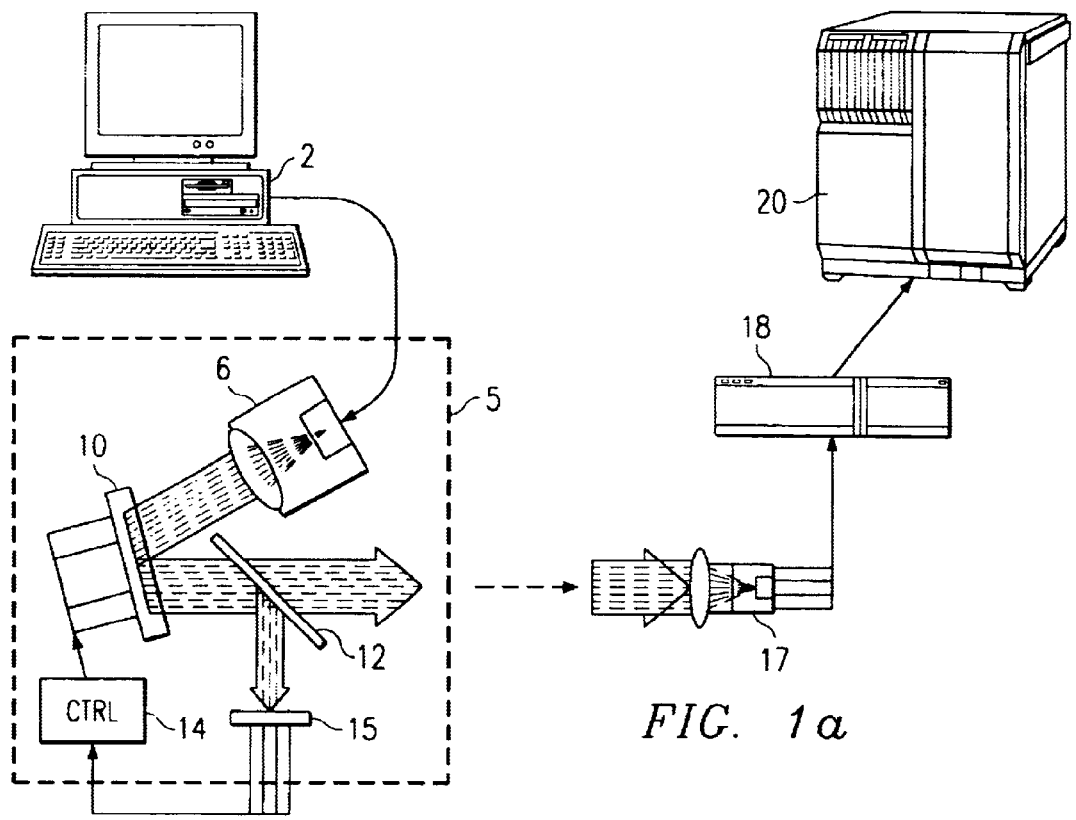
FIG. 1a is a schematic drawing of an optical wireless network using a packaged micromirror assembly.

Referring first to FIG. 1a, an example of an optical wireless network will be illustrated, to provide context for the present invention. In this simple example, unidirectional communications are to be carried out from computer 2 to server 20, by way of modulated directed light. In this example, computer 2 is a conventional microprocessor based personal computer or workstation, including the appropriate network interface adapter for outputting the data to be communicated. Computer 2 is connected to transmitter optical module 5, which aims a directed light beam at the desired receiver 17, and which modulates the light beam to communicate the data.

Alternatively, the transmitting source may be a network switch or router, a source of video data such as a DVD player or a television set-top converter box, or the like, rather than computer 2 as shown. It is contemplated that the present invention may be used in connection with effectively any source of digital data.

In this example, transmitter optical module 5 includes modulating laser 6, which generates a collimated coherent light beam of the desired wavelength (e.g., 850 nm) and power (e.g., on the order of 4 to 5 $\mu W/cm^2$ measured at 50 meters, with a spot size of on the order of 2.0 to 2.5 mm in diameter). Modulating laser 6 modulates this light beam according to the digital data being transmitted. The modulation scheme used preferably follows a conventional data communications standard, such as those used in connection with fiber optic communications for similar networks. The modulated laser beam exits modulating laser 6 and is reflected from micromirror assembly 10 toward receiver 17. The construction of micromirror assembly 10 according to the preferred embodiments of the invention will be described in further detail below.

On the receiver end, receiver 17 captures the incoming directed light beam, and converts the modulated light energy to an electrical signal; for example, receiver 17 may include a photodiode, which modulates an electrical signal in response to the intensity of detected light. Such other conventional receiver circuitry, such as demodulators, filters, and the line, are also provided. The demodulated communicated electrical signal is then forwarded from receiver 17 to router 18, and thus into the receiving network, for eventual distribution to server 20, in this example.

As evident from FIG. 1a and the foregoing description, this example illustrates a unidirectional, or simplex, communications approach, for ease of this description. It will be appreciated by those skilled in the art that bi-directional, or duplex, communications may be carried out by providing another transmitter-receiver pair for communicating signals in the opposite direction (router 18 to computer 2).

The communications arrangement of FIG. 1a may be utilized in connection with a wide range of applications, beyond the simple computer-to-network example suggested by FIG. 1a. For example, it is contemplated that each of multiple computers in an office or other workspace may communicate with one another and with a larger network by way of modulated light to a central receiver within the room, and also between rooms by way of relayed communications along hallways or in a space frame. Other indoor applications for this optical wireless communications may include the communication of video signals from a computer or DVD player to a large-screen projector. It is further contemplated that optical wireless communications in this fashion may be carried out in this manner but on a larger scale, for example between or among buildings.

The positioning of micromirror assembly 10 must be precisely controlled to aim the modulated laser beam at receiver 17, and thus optimize the signal-to-noise ratio of the transmitted signals. It is contemplated that this precision positioning is preferably accomplished by way of calibration and feedback, so that the mirror is able to sense its position and make corrections. Previous efforts toward providing such positioning, in connection with the present invention, have included external sensors such as illustrated in FIG. 1a.

As shown in this example, the reflected laser beam impinges beam splitter 12. Beam splitter 12 transmits the majority of the energy to receiver 17, but reflects a portion of the energy to position sensitive detector (PSD) 15. PSD 15 provides signals to control circuitry 14, indicating the position of the reflected light that it receives. Control circuitry 14 then issues control signals to micromirror assembly 10 to direct its angle of reflection in response to the signals from PSD 15, optimizing the aim of the directed laser beam at receiver 17. In one example, during setup of the transmission, micromirror assembly 10 and PSD 15 "sweeps" the aim of the directed laser beam across the general area of receiver 17. In response, receiver 17 issues signals to control circuitry 14 over a secondary communications channel (not shown), indicating the received energy over time. These "pings" may be compared with the instantaneous position of micromirror assembly 10 as measured by PSD 15, to calibrate and optimize the aim of micromirror assembly 10 to achieve maximum energy transmission. Once this aim is set, communications may then be carried out. It is contemplated, however, that adjustments may be necessary due to external factors such as building or equipment movement and the like. These adjustments may be carried out by way of feedback from receiver 17 (either over the secondary channel or as transmit mode feedback in a duplex arrangement), or by periodically repeating the measurement and sweeping.

Figure 1B:
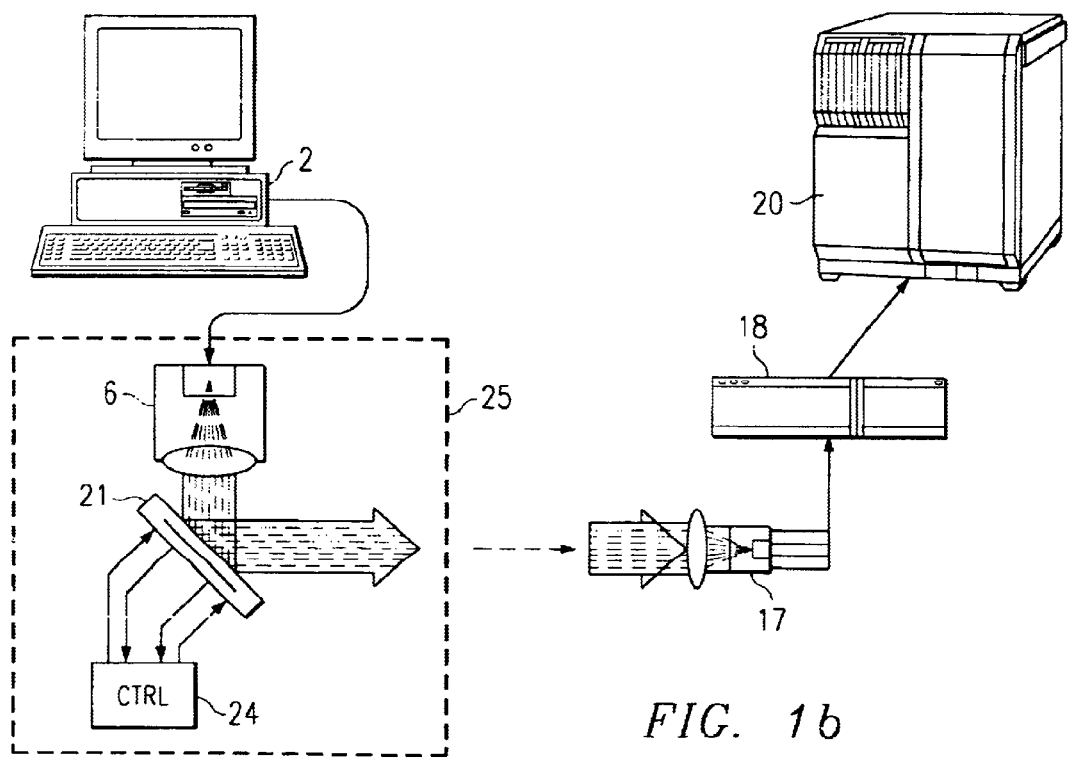
FIG. 1b is a schematic drawing of an optical wireless network using a packaged micromirror assembly according to the preferred embodiments of the invention.

The provision of beam splitter 12 and PSD 15 in transmitter optical module 5 as shown in FIG. 1a provides the desired feedback control of the reflection of the laser beam. However, from a cost and reliability standpoint, it is desired to reduce the number of components in the transmitter optical module. Referring now to FIG. 1b, a communications system according to the preferred embodiments of the invention, in which the packaged micromirror assembly includes integral position sensing capability, will now be described.

As shown in FIG. 1b, transmitter optical module 25 includes packaged micromirror assembly 21 that directly reflects the laser beam from laser 6 to receiver 17, without a beam splitter or other external components interposed in the path of the beam. Packaged micromirror assembly 21, as will be described in detail below, includes sensing capability by way of which the orientation of the mirror is detected and a signal generated that is applied to control circuit 24. In response, control circuit 24 provides electrical signals to packaged micromirror assembly 21 to position the mirror, so that the beam may impinge receiver 17 in an optimal manner.

Because of the in-package positional feedback provided by packaged micromirror assembly 21, transmitter optical module 25 may be manufactured at significantly lower cost. In addition, by eliminating the beam splitter, transmitter optical module 25 avoids the inherent loss of beam intensity that is otherwise directed to the position sensitive detector.

Figure 2A:
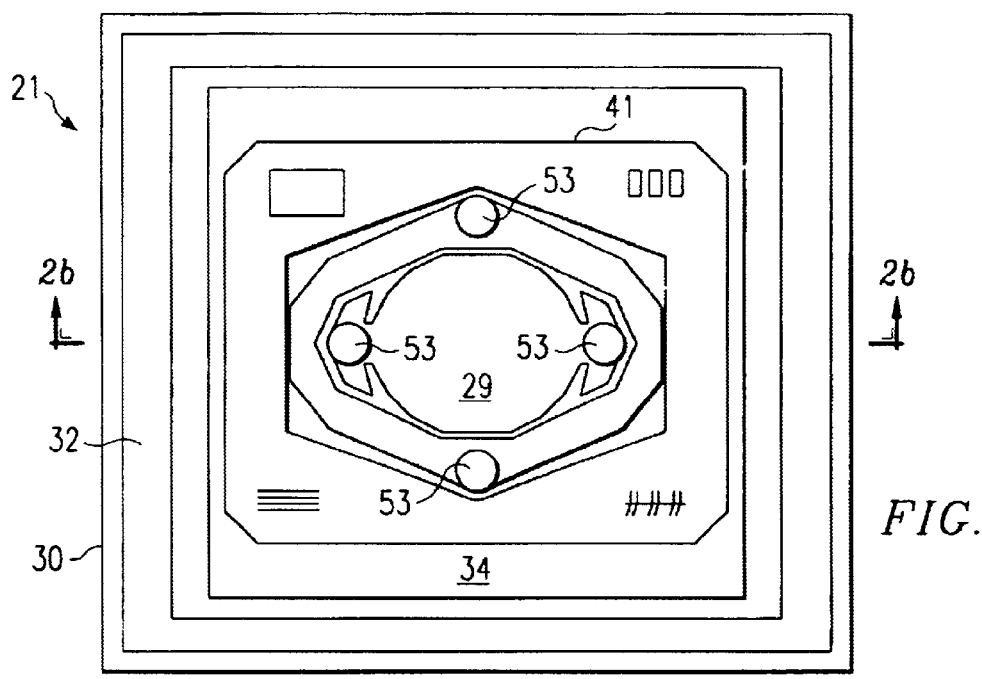
FIGS. 2a and 2b are plan and cross-sectional views, respectively, of a packaged micromirror assembly according to a first preferred embodiment of the invention.
Figure 2B:
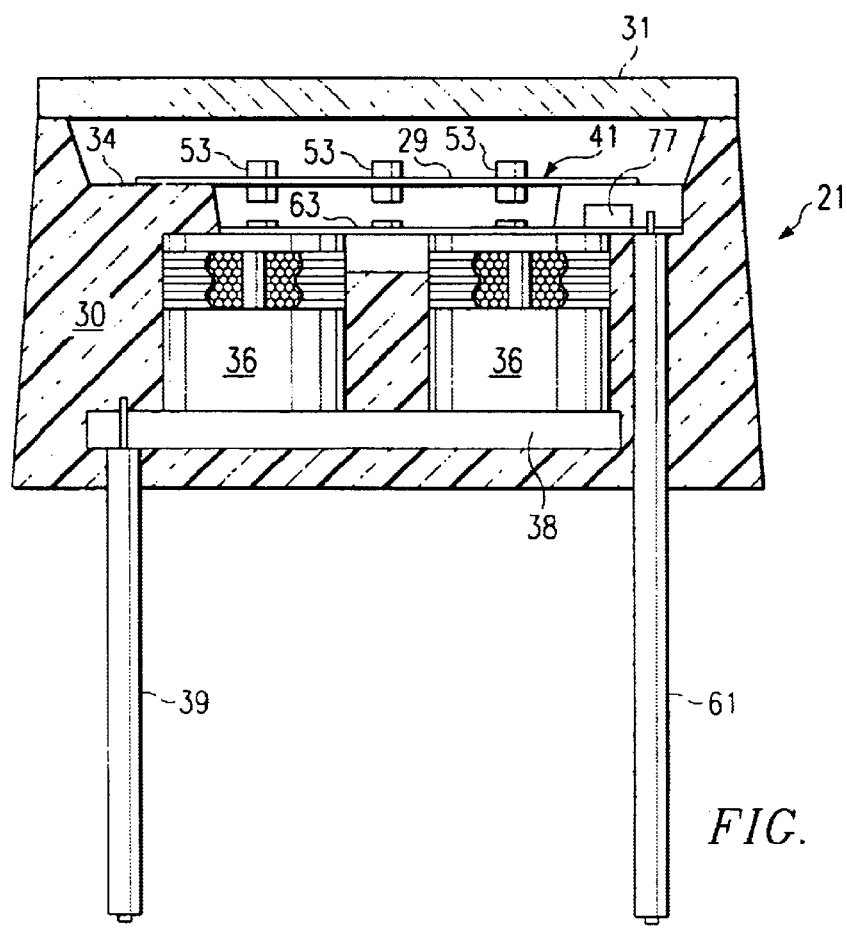

Referring now to FIGS. 2a and 2b, packaged micromirror assembly 21 according to a first preferred embodiment of the invention will now be described. As shown in FIGS. 2a and 2b and as will be described in further detail below, mirror element 41 is formed of a single piece of material, preferably single-crystal silicon, photolithographically etched in the desired pattern, to form mirror surface 29 and its supporting hinges and frame. To improve the reflectivity of mirror surface 29, mirror element 41 is preferably plated with a metal, such as gold or aluminum. In its assembled form, as shown in FIGS. 2a and 2b, four permanent magnets 53 are attached to mirror element 41, at a 90° relative orientation from one another, to provide the appropriate rotation. Magnets 53 may be formed of any permanently magnetizable material, a preferred example of which is neodymium-iron-boron.

FIGS. 3 and 3a through 3d illustrate mirror element 41 in further detail. Mirror element 41 includes a frame portion, an intermediate gimbals portion, and an inner mirror portion, all preferably formed from one piece of crystal material such as silicon. In its fabrication, silicon is etched to provide outer frame portion 43 forming an opening in which intermediate annular gimbals portion 45 is attached at opposing hinge locations 55 along first axis 31. Inner, centrally disposed mirror portion 47, having a mirror 29 centrally located thereon, is attached to gimbals portion 45 at hinge portions 55 on a second axis 35, 90 degrees from the first axis. Mirror 29, which is on the order of 100 microns in thickness, is suitably polished on its upper surface to provide a specular surface. Preferably, this polished surface is plated with a metal, such as aluminum or gold, to provide further reflectivity. In order to provide necessary flatness, the mirror is formed with a radius of curvature greater than approximately 2 meters, with increasing optical path lengths requiring increasing radius of curvature. The radius of curvature can be controlled by known stress control techniques such as, by polishing on both opposite faces and deposition techniques for stress controlled thin films. If desired, a coating of suitable material can be placed on the mirror portion to enhance its reflectivity for specific radiation wavelengths.

Mirror element 41 includes a first pair of permanent magnets 53 mounted on gimbals portion 45 along the second axis, and a second pair of permanent magnets 53 mounted on extensions 51, which extend outwardly from mirror portion 47 along the first axis. In order to symmetrically distribute mass about the two axes of rotation to thereby minimize oscillation under shock and vibration, each permanent magnet 53 preferably comprises a set of an upper magnet 53a mounted on the top surface of the mirror element 41 using conventional attachment techniques such as indium bonding, and an aligned lower magnet 53b similarly attached to the lower surface of the mirror assembly as shown in FIGS. 3a through 3d. The magnets of each set are arranged serially such as the north/south pole arrangement indicated in FIG. 3c. There are several possible arrangements of the four sets of magnets which may be used, such as all like poles up, or two sets of like poles up, two sets of like poles down; or three sets of like poles up, one set of like pole down, depending upon magnetic characteristics desired.

By mounting gimbals portion 45 to frame portion 43 by means of hinges 55, motion of the gimbals portion 45 about the first axis 31 is provided and by mounting mirror portion 47 to gimbals portion 45 via hinges 55, motion of the mirror portion relative to the gimbals portion is obtained about the second axis 35, thereby allowing independent, selected movement of the mirror portion 47 along two different axes.

Figure 3:
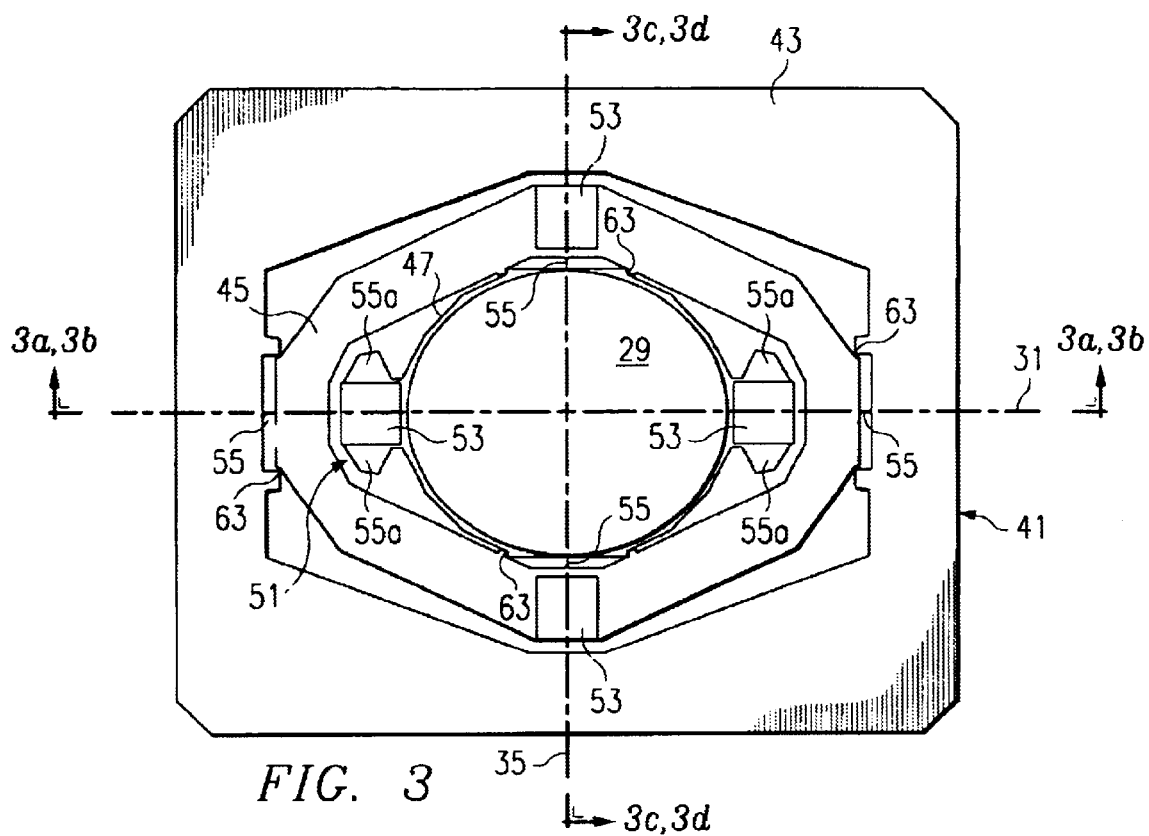
FIG. 3 is a plan view of a mirror element in the packaged micromirror assembly according to the first preferred embodiment of the invention.
Figure 3A:
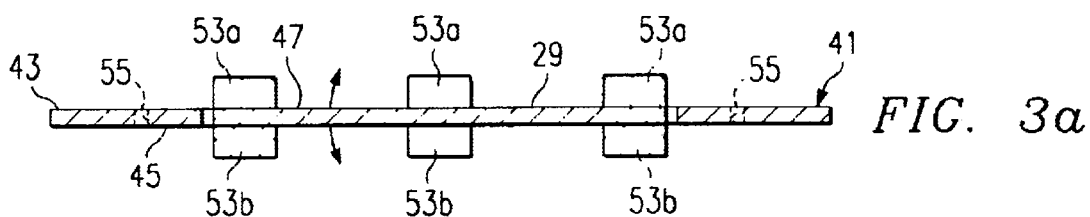
FIGS. 3a through 3d are cross-sectional views of the mirror element of FIG. 3, illustrating its operation.
Figure 3B:
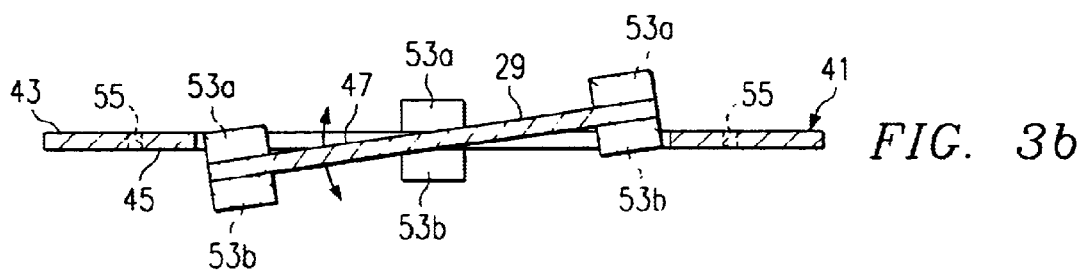
Figure 3C:
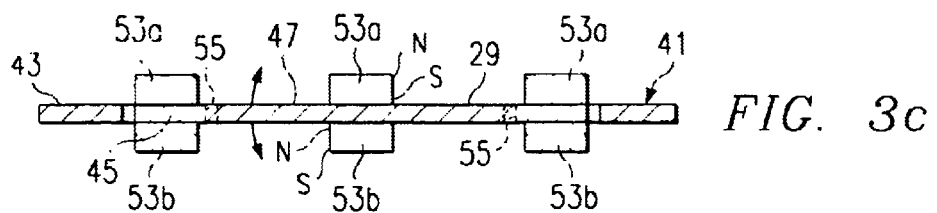
Figure 3D:
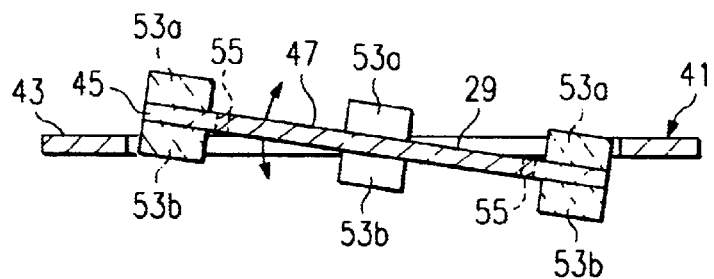

The middle or neutral position of mirror element 41 is shown in FIG. 3a, which is a section taken through the assembly along line A—A of FIG. 3. Rotation of mirror portion 47 about axis 35 independent of gimbals portion 45 and/or frame portion 43 is shown in FIG. 3b as indicated by the arrow. FIG. 3c shows the middle position of the mirror element 41, similar to that shown in FIG. 3a, but taken along line B—B of FIG. 3. Rotation off the gimbals portion 45 and mirror portion 47 about axis 31 independent of frame portion 43 is shown in FIG. 3d as indicated by the arrow. The above independent rotation of mirror 29 of mirror portion 47 about the two axes allows direction of optical beam 13 as needed by the optical switch units.

In order to protect hinges 55 from in-plane shock during handling and shipping, stops 57 may be provided, as described in the above-incorporated application Ser. No. 09/310,284. According to another optional feature of the invention, lock down tabs associated with each hinge are provided, also as described in the above-incorporated application Ser. No. 09/310,284.

Referring back to FIG. 3, extensions 51 are preferably provided with laterally extending tabs 51a, which can be used to clamp down the mirror portion during assembly to thereby provide additional stress protection.

Mirror element 41, in this embodiment of the invention, rests upon and is attached to shelf 34 of body 30. Shelf 34 lies inwardly of window shelf 32, upon which transparent window 31 rests and is attached. Window 31 may be formed of conventional microscope slide glass, or of a transparent plastic such as LEXAN plastic. It is highly preferred that the dimensions and locations of shelves 32, 34, as well as the bottom well of body 30, be selected so that the maximum deflection of mirror 29 is stopped by one of magnets 53 impacting body 30 without mirror 29 itself impacting the inner surface of window 31. Additionally, it is preferred that the maximum deflection of mirror 29 is limited, by body 30, to an angle that is well below that which overstresses hinges 55.

Further detail regarding the construction and method of manufacturing packaged micromirror assembly 21 according to the preferred embodiments of the invention, including alternative methods for such manufacture, is provided in copending provisional application No. 60/234,074, filed Sep. 20, 2000, entitled "Molded Packages for Optical Wireless Network Micromirror Assemblies", commonly assigned herewith and incorporated herein by this reference.

As shown in the cross-section of FIG. 2b, packaged micromirror assembly 21 includes position sensor 63 physically disposed between mirror assembly 41 and driver coils 36, and thus in close proximity to mirror element 41. Sensor 63 is preferably mounted to body 30 prior to the attachment of mirror element 41, as sensor 63 is positioned between body 30 and mirror element 41. Position sensor 63 is electrically connected to leads 61, to provide electrical signals (or response, in the passive sense) to external circuitry such as control circuitry 24 in transmitter optical module 25. In this example, therefore, packaged micromirror assembly 21 provides position sensing signals to control circuitry 24 on leads 61, and receives position input signals on leads 39. The complete feedback sensing and control response is thus provided within packaged micromirror assembly 21 itself, according to the present invention.

Figure 4A:
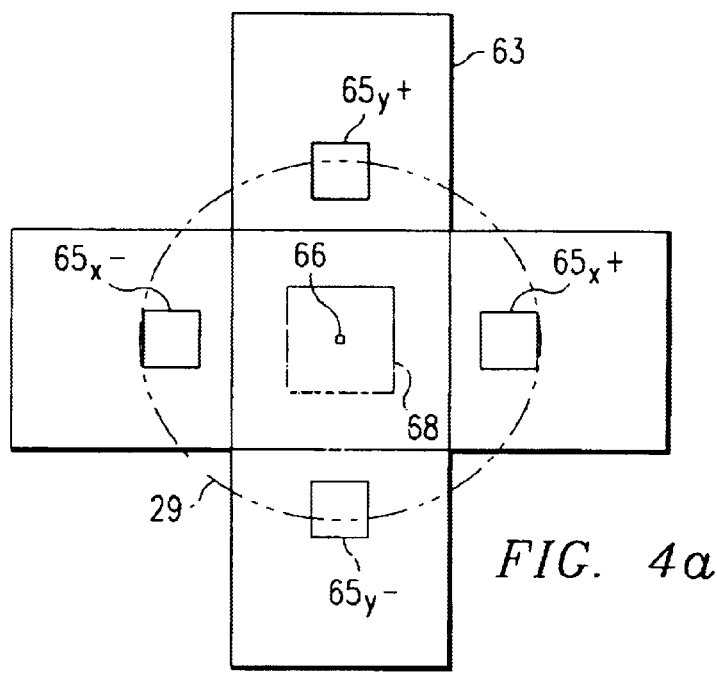
FIGS. 4a and 4b are plan and cross-sectional views, respectively, of a packaged micromirror assembly according to a first preferred embodiment of the invention.
Figure 4B:
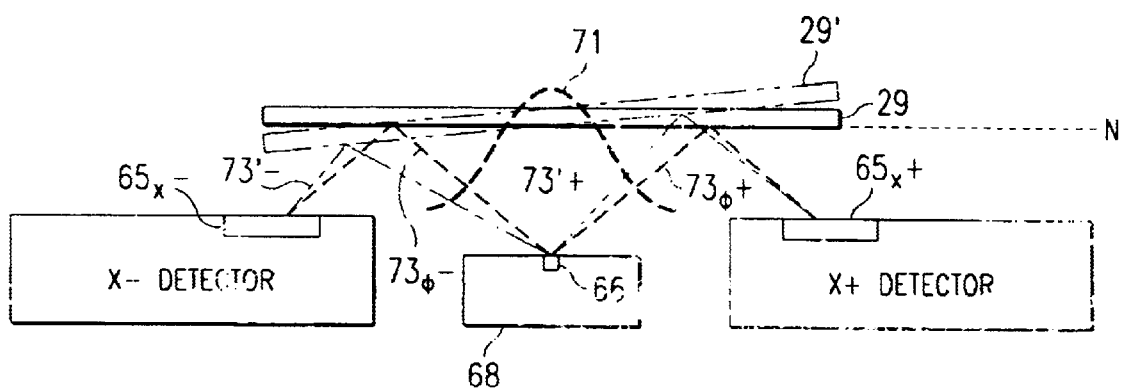

According to a first preferred embodiment of the invention, as shown in FIGS. 4a and 4b, the mechanism by way of which the position of mirror 29 is sensed uses incident light produced below the surface of mirror 29 and reflected from its underside. As shown in FIG. 4a, position sensor 63 according to this first embodiment of the invention is a printed circuit board having light-emitting-diode (LED) 68 that emits light through point aperture 66 toward the underside of mirror 29. As shown in FIG. 4b, this arrangement of LED 68 and aperture 66 provides distribution 71 of light intensity that is substantially Gaussian in shape, with the light intensity imparted to mirror 29 being at a maximum at its center point, and falling off sharply away from the center. For example, a standard deviation of on the order of 40° for distribution 71 is contemplated to be suitable for use in connection with this embodiment of the invention. This distribution 71 of light intensity is used to determine the position of mirror 29, as will be described below.

Sensor 63 also includes four light detectors 65, spaced 90° from one another as shown in FIG. 4a. In this example, detectors 65x+, 65x− are located along the positive and negative horizontal axes, using aperture 66 as the origin; detectors 65y+, 65y− are located along the positive and negative vertical axes in similar fashion. It is preferred that detectors 65 are placed at the same radial distance from aperture 66. Detectors 65 are preferably electrically coupled or connected to external circuitry, for example via leads 61 (FIG. 2b).

In operation, sensor 63 is able to detect changes in the orientation of mirror 29 from variations in the light intensity sensed by detectors 65, as will now be described relative to FIG. 4b. The example of FIG. 4b illustrates the operation of sensor 63 for rotation in one axis only, for clarity of description; it will of course be understood by those skilled in the art, from this example, that the operation of sensor 63 in two axes will be similar. In any rotation, the intensity of the light emitted by LED 68 through aperture 66 will be applied to the underside of mirror 29 in a manner with the point of highest intensity at the center of mirror 29. However, the location of mirror 29 from which light reflects to each of detectors 65 and, given distribution 71 of this light, the intensity of the light reflected to detectors 65, varies with the rotational orientation of mirror 29. In the null, or flat, position N of mirror 29, as shown in FIG. 4b, the light that will be reflected by mirror 29 to each of sensors 65 originates from aperture 66 at substantially the same angle relative to the normal (i.e., perpendicular to the surface of LED 68), as shown by paths $73_0+$ and $73_0-$ to sensors 65x+, 65x−, respectively. From this position of mirror 29, equal light intensity will be sensed by detectors 65x+, 65x−.

Upon the rotation of mirror 29 into a rotated position 29', as shown in FIG. 4b, detectors 65x+, 65x− will sense different magnitudes of light intensity. This differential magnitude is due to the change in the paths traveled by the emitted light. As shown in this example, with mirror 29 rotated toward detector 65x−, path 73'− traveled by light reflected to detector 65x− originates from aperture 66 at an angle farther from normal than when in the null position. As a result, detector 65x− will receive lower intensity reflected light from mirror 29 in rotated position 29'. On the other hand, path 73'+ traveled by light reflected to detector 65x+ with mirror 29 in position 29' originates from aperture 66 at an angle closer to normal than in the null position. Because of the significantly higher intensity of light imparted by LED 68 through aperture 66 at points nearer the center of mirror 29, detector 65x+ will receive a higher magnitude of light with mirror 29 in rotated position 29' than from mirror 29 in its null position.

As a result of the variations of detected reflected light with the rotational position of mirror 29, as sensed by detectors 65, sensor 63 can generate or modulate electrical signals indicative of the intensity of detected light. These signals can then be used to determine the rotational position of mirror 29, and thus to control the positioning of mirror 29 to aim the laser beam toward the desired receiver.

In the foregoing implementation of the first preferred embodiment of the invention, a single light source is defined by aperture 66, with multiple detectors 65 angularly arranged at a common radius from the center axis. Alternatively, multiple light sources may be angularly arranged away from the center axis, for example at the locations of detectors 65 illustrated in FIG. 4a, in combination with a single detector located at the center axis (i.e., at the location of aperture 66 in FIG. 4a). According to this alternative, the multiple light sources (e.g., LEDs and apertures) would illuminate the underside of mirror 29 in a pattern from which the path intensities could be derived. For example, the multiple LEDs could be activated in a temporal sequence, with the detected reflected light analyzed according to a synchronized sequence in order to determine the relative light intensities along each path. The multiple light sources could emit their light simultaneously, but at different modulation frequencies, in which case signals corresponding to the detected light would be demodulated to determine a frequency spectrum indicative of the relative path intensities.

In any case, additional intelligence may be provided within sensor 63, if desired, to facilitate the feedback and control of mirror 29. Referring back go FIG. 2b, memory 77 is provided on the printed circuit board of sensor 63, for storing calibration information. Because of manufacturing tolerances, it is contemplated that a flat, null, position of mirror 29 may not correspond to a balanced light intensity reading among detectors 65; as a result, the intensity readings may require calibration, from assembly to assembly, to ensure that a "zero" electrical signal corresponds to a flat mirror orientation, even if the detected light intensities are not balanced. Memory 77 is therefore optionally provided to store calibration data for each of detectors 65, or for the detectors 65 in the aggregate, so that the resulting electrical signal presented by assembly 21 corresponds to the deviation of mirror 29 from null. In this regard, memory 77 is preferably a non-volatile read/write memory, such as an EEPROM. For example, the manufacturer may pre-calibrate each assembly 21 in factory testing, and store the calibration values in memory 77. The users of assemblies 21 can then rely on the electrical signals to indicate mirror orientation, without performing additional calibration at the system application.

Figure 5A:
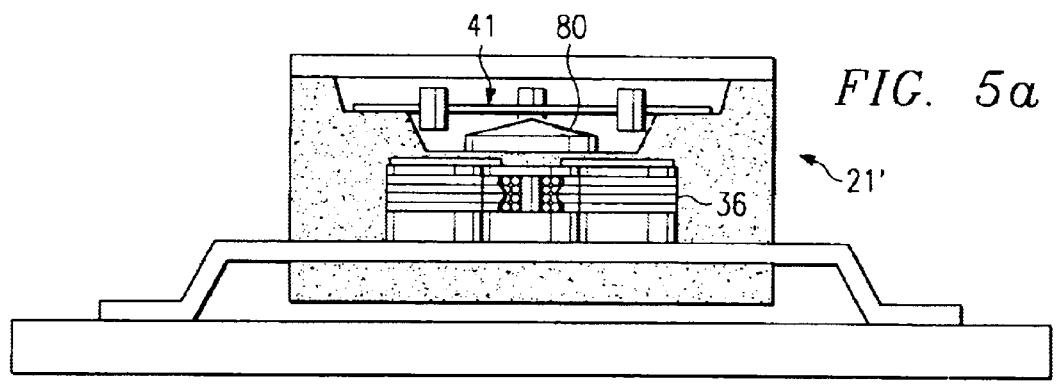
FIGS. 5a through 5c are various views of a packaged micromirror assembly according to a second preferred embodiment of the invention.
Figure 5B:
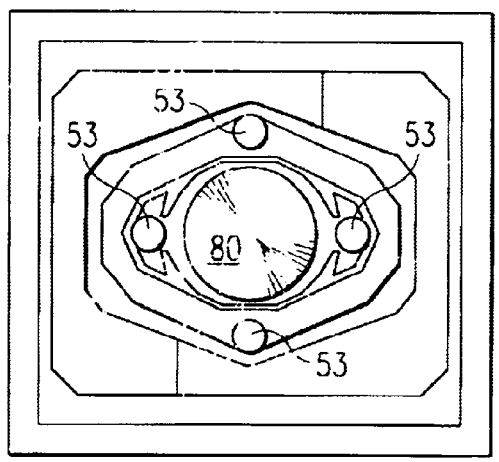
Figure 5C:
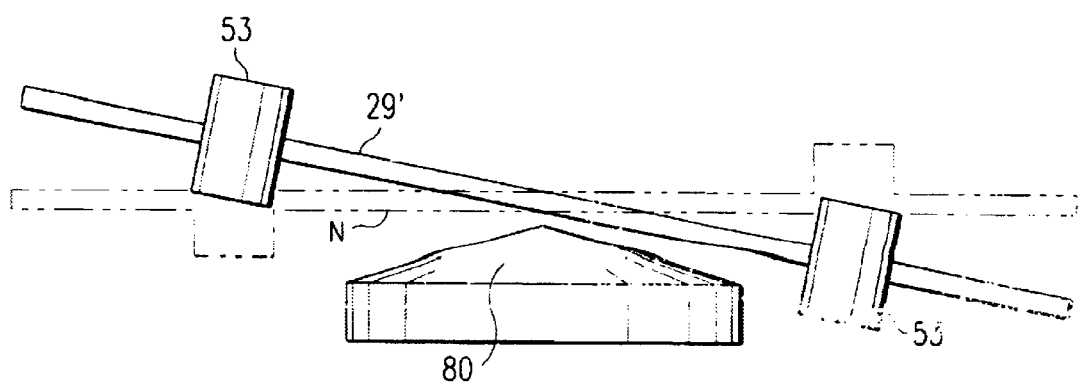

Referring now to FIGS. 5a through 5c, packaged micromirror assembly 21' according to a second preferred embodiment of the invention will now be described in detail. The components of packaged micromirror assembly 21' according to this embodiment of the invention are, for the most part, similar to those described above in packaged micromirror assembly 21. By way of example, the body of packaged micromirror assembly 21' is formed by a transfer molded approach, as described in the above-incorporated provisional application No. 60/234,074, and patent application Ser. No. 09/955,506; of course, other packaging techniques may also be used in connection with the present invention. According to this preferred embodiment of the invention, however, packaged micromirror assembly 21' includes capacitive sensor 80, for detecting the rotational position of mirror 29 by variations in capacitance.

As shown in FIG. 5a, capacitive sensor 80 has a conical upper shape, and is disposed between driver coils 36 and mirror element 41. The vertex of capacitive sensor 80 is disposed under the center point of mirror 29, so that this center point, relative to which the potential rotations of mirror 29 are made, remains in a fixed position relative to this vertex, with a small space between sensor 80 and mirror 29 at this point.

FIG. 5b illustrates capacitive sensor 80 in plan view. As shown in FIG. 5b, sensor 80 is segmented into multiple sections that are electrically isolated from one another. In this example, sensor 80 has four segments, each corresponding to a quadrant of the plane defined by the two axes of rotation of mirror 29. In this example, each of magnets 53 are centered within one of the segments of sensor 80 (rather than between segments).

As a result of this construction of sensor 80, rotations of mirror 29 from a null position will place mirror 29 closer to one or more of the sensor segments than others. In the example shown in FIG. 5c, mirror 29 is rotated into rotated position 29', in which case mirror 29 is nearer the right-hand segment of sensor 80 (as shown in FIG. 5c) than to the left-hand segment.

The variation in the distance between mirror 29 and sensor 80 may be converted into an electrical signal by considering mirror 29 as one plate of a capacitor, and each of the segments of sensor 80 as opposing plates of multiple capacitors. The distance between mirror 29 and each segment of sensor 80 will determine the value of capacitance between these two plates. As is fundamental in the art, capacitance is inversely proportional to the dielectric distance. This capacitance value is then measured by conventional techniques, for example by the application of a high frequency input signal between mirror 29, on one hand, and each of the segments of sensor 80, on the other hand; the response of the capacitors to the high frequency input signal will indicate the value of capacitance between each segment of sensor 80 and mirror 29. Alternatively, the capacitors established by the various segments of sensor 80 may be arranged into a conventional capacitance bridge, by way of which the various capacitance legs may be determined in the known manner. The resulting measurements may be communicated from packaged micromirror assembly 21' by way of external leads (e.g., leads 61 of FIG. 2b).

Additionally, a memory device may optionally be provided within packaged micromirror assembly 21', for storing calibration values in the manner discussed above relative to assembly 21.

Alternatively, sensor 80 may be flat, rather than conical. This construction would provide a lower cost sensor, but would likely result in reduced sensitivity because of the reduction in capacitance between the flat sensor and mirror 29.

Further in the alternative, it is contemplated that relative inductance between sensor 80 and mirror 29 may be detected and used to measure the relative orientation of mirror 29.

Similarly as described above relative to the first embodiment of the invention, the capacitance measurement approach of packaged micromirror assembly 21' provides direct feedback of the position of mirror 29, without requiring external components such as a beam splitter and a position sensitive detector as shown in FIG. 1a. This provides an optical transmitter module that can be fabricated at lower cost, with higher reliability. Additionally, the full intensity of the directed laser beam may be used for data transmission, without the losses inherent in the use of a beam splitter.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A packaged micromirror assembly, comprising:
   a mirror element;
   a plurality of driver elements responsive to electrical signal elements for orientating the mirror element;
   a body encasing at least one driver element and to which the mirror element is attached; and
   a sensor, disposed beneath the mirror element, for detecting the orientation of the mirror, wherein the sensor comprises:
      a plurality of light sources for illuminating an underside of the mirror surface: and
      at least one detector for detecting light imparted by the at least one light source and reflected from the underside of the mirror surface:
   wherein the combination of the plurality of light sources and at least one detector provide a plurality of reflection paths over which the intensity of reflected light is measured.

2. The assembly of claim 1, wherein the sensor has electrical leads extending from the body for presenting an indication of the orientation of the mirror.

3. The assembly of claim 2, further comprising:
   a memory for storing calibration values of the sensor.

4. The assembly of claim 1, wherein the
   plurality of light sources are angularly arranged under the mirror surface, each for illuminating an underside of the mirror surface; and
   the detector is located coaxially with the mirror surface for detecting the intensity of light from each of the plurality of light sources after reflection from the underside of the mirror surface.

5. A packaged micromirror assembly, comprising:
   a mirror element;
   a plurality of driver elements responsive to electrical signal elements for orientating the mirror element;
   a body encasing at least one driver element and to which the mirror element is attached; and
   a sensor, disposed beneath the mirror element, for detecting the orientation of the mirror wherein the sensor comprises:
      a light source for illuminating an underside of the mirror surface; and
      a plurality of detectors, angularly arranged under the mirror surface, for detecting the intensity of light from the light source after reflection from the underside of the mirror surface.

6. The assembly of claim 5, wherein the light source comprises:
   a light-emitting diode; and
   an aperture directed at a center point of the underside of the mirror surface, through which light from the light-emitting diode passes.

7. The assembly of claim 5, further comprising:
   a memory for storing calibration values of the sensor.

8. An electronic system, comprising:
   a data source, for generating data to be communicated to a receiver; and
   a transmitter optical module, comprising:
      a light source, coupled to the data source, for generating a modulated directed light beam; and
      a packaged micromirror assembly for directing the directed light beam at the receiver, comprising:
         a mirror element formed of a single piece of crystalline material, the mirror element having a frame, a mirror surface, and a plurality of hinges;
         at least one permanent magnet attached to the mirror element;
         a plurality of coil drivers, in proximity to the at least one permanent magnet, for orienting the mirror element;
         a body encasing the plurality of coil drivers, and to which the mirror element is attached; and
      a sensor, disposed between the body and the mirror element, for detecting the orientation of the mirror wherein the sensor comprises:
         a plurality of one light sources for illuminating an underside of the mirror surface; and
         at least one detector for detecting light imparted by the at least one light source and reflected from the underside of the mirror surface;
      wherein the combination of the plurality of light sources and at least one detector provide a plurality of reflection oaths over which the intensity of reflected light is measured.

9. The system of claim 8, wherein the data source comprises a computer.

10. The system of claim 8, wherein the light source comprises a laser.

11. The system of claim 8, wherein the packaged micromirror assembly further comprises:
    control circuitry, coupled to the sensor and to the driver coils, for applying a signal to the driver coils responsive to the detected orientation of the mirror.

12. The system of claim 11, wherein the sensor has electrical leads extending from the body to the control circuitry, for presenting an indication of the orientation of the mirror.

13. The system of claim 8, further comprising:
    a memory for storing calibration values of the sensor.

14. The system of claim 8, wherein the
    plurality of light sources are angularly arranged under the mirror surface, each for illuminating an underside of the mirror surface; and
    the detector is located coaxially with the mirror surface for detecting the intensity of light from each of the plurality of light sources after reflection from the underside of the mirror surface.

15. An electronic system, comprising:
    a data source, for generating data to be communicated to a receiver; and
    a transmitter optical module, comprising:
        a light source, coupled to the data source, for generating a modulated directed light beam; and
        a packaged micromirror assembly for directing the directed light beam at the receiver, comprising:

a mirror element formed of a single piece of crystalline material, the mirror element having a frame, a mirror surface, and a plurality of hinges;

at least one permanent magnet attached to the mirror element;

a plurality of coil drivers, in proximity to the at least one permanent magnet, for orienting the mirror element;

a body encasing the plurality of coil drivers, and to which the mirror element is attached; and a sensor, disposed between the body and the mirror element, for detecting the orientation of the mirror, wherein the sensor comprises:

a light source for illuminating an underside of the mirror surface; and a plurality of detectors, angularly arranged under the mirror surface, for detecting the intensity of light from the light source after reflection from the underside of the mirror surface.

16. The system of claim 15, wherein the light source comprises:

a light-emitting diode; and an aperture directed at a center point of the underside of the mirror surface, through which light from the light-emitting diode passes.

17. The assembly of claim 15, further comprising:

a memory for storing calibration values of the sensor.

18. A method of transmitting data signals, comprising:

generating a modulated light beam;

orienting a micromirror to reflect the modulated light beam from an upper surface of the micromirror to a receiver;

directing light at an underside of the micromirror;

detecting light reflected from the underside of the micromirror at a plurality of locations arranged at a plurality of angles; and determining the orientation of the micromirror from the detected reflected light at the plurality of locations.

19. The method of claim 18, wherein the orienting step comprises:

selectively energizing a plurality of coil drivers, each in proximity to at least one permanent magnet attached to the underside of the micromirror.

20. The method of claim 19, wherein the orienting step orients the micromirror to a null position;

and further comprising:

detecting the relative light intensity at each of the plurality of locations with the micromirror at the null position; and storing, in a memory, calibration values corresponding to the micromirror at the null position.

* * * * *